United States Patent
Ovenshire et al.

(10) Patent No.: US 9,688,034 B2
(45) Date of Patent: Jun. 27, 2017

(54) AUTOMOTIVE LIGHT ASSEMBLY WITH INNER LENS FOR COMBINED DAYTIME RUNNING LIGHT AND POSITION LIGHT FUNCTIONS

(71) Applicant: GM GLOBAL TECHNOLOGY OPERATIONS LLC, Detroit, MI (US)

(72) Inventors: Jay H. Ovenshire, Rochester, MI (US); Daniel E. Schmeckpeper, Clarkston, MI (US); Catherine A. Ostrander, Grand Blanc, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 479 days.

(21) Appl. No.: 14/503,540

(22) Filed: Oct. 1, 2014

(65) Prior Publication Data

US 2016/0097507 A1    Apr. 7, 2016

(51) Int. Cl.
| | |
|---|---|
| *F21S 8/10* | (2006.01) |
| *B29D 11/00* | (2006.01) |
| *B29C 45/00* | (2006.01) |
| *B60Q 1/00* | (2006.01) |
| *B60Q 1/26* | (2006.01) |
| *B60Q 1/28* | (2006.01) |
| *C08L 33/12* | (2006.01) |
| *B29K 33/00* | (2006.01) |
| *B29K 33/18* | (2006.01) |

(52) U.S. Cl.
CPC ........ *B29D 11/00403* (2013.01); *B29C 45/00* (2013.01); *B29D 11/00663* (2013.01); *B60Q 1/0041* (2013.01); *B60Q 1/2607* (2013.01); *B60Q 1/28* (2013.01); *F21S 48/215* (2013.01); *F21S 48/2243* (2013.01); *F21S 48/2268* (2013.01); *F21S 48/2293* (2013.01); *B29K 2033/12* (2013.01); *B29K 2033/18* (2013.01); *B60Q 2400/30* (2013.01); *C08L 33/12* (2013.01)

(58) Field of Classification Search
CPC ........ B29D 11/00403; B29D 11/00663; B29C 45/00; B60Q 1/0041; B60Q 1/2607; B60Q 1/28; F21S 48/215; F21S 48/2243; F21S 48/2268; F21S 48/2293
See application file for complete search history.

(56) References Cited

U.S. PATENT DOCUMENTS

| | | | |
|---|---|---|---|
| 2002/0077430 A1 | 6/2002 | Zimmerman | |
| 2009/0230893 A1* | 9/2009 | Hohl-AbiChedid . | B60Q 1/0023 315/313 |

* cited by examiner

*Primary Examiner* — Thomas M Sember
(74) *Attorney, Agent, or Firm* — Quinn IP Law

(57) ABSTRACT

A light assembly including two light sources through a single inner lens made of two separate materials includes a first light source that is operable to emit light for a position light function of the vehicle, and a second light source that is operable to emit light for a Daytime Running Light function of the vehicle. The light assembly further includes an inner lens having a first portion and a second portion. The first portion is formed from a mixture of polymethyl methacrylate and polyetheresteramide, and is operable to receive light from the first light source adjacent a light receiving edge of the first portion and reflect the light to provide the position light function. The second portion of the inner lens is formed from polymethyl methacrylate without polyetheresteramide, and is operable to receive light from the second light source and direct the light to provide the DRL function.

20 Claims, 3 Drawing Sheets

AUTOMOTIVE LIGHT ASSEMBLY WITH INNER LENS FOR COMBINED DAYTIME RUNNING LIGHT AND POSITION LIGHT FUNCTIONS

TECHNICAL FIELD

The disclosure generally relates to a light assembly for a vehicle, and a method of manufacturing an inner lens of the light assembly.

BACKGROUND

Automobiles may include a light assembly that provides several different light functions. For example, the light assembly typically provides a high and/or low beam for a forward driving function, a Daytime Running Light (DRL) function, and a position light function. The forward driving function illuminates a roadway ahead of the vehicle to enable the driver to see the roadway in low light conditions. The DRL function provides light to make the vehicle visible to oncoming traffic during daylight. The position light function provides light to make the vehicle visible to oncoming traffic during low light conditions or at night. Because the position light function operates at night or in low light conditions, the position light function requires a relatively low light output to be visible. However, because the DRL function operates during the daylight, the DRL function requires a high light output to be visible. Accordingly, the DRL function requires a higher intensity light output than does the position light function. In addition to providing the necessary lighting functions, vehicle designers strive to make the light assemblies as aesthetically pleasing and optically homogenous as possible.

SUMMARY

A light assembly for a vehicle is provided. The light assembly includes a first light source and a second light source. The first light source is operable to emit light for a position light function of the vehicle. The second light source is operable to emit light for a Daytime Running Light (DRL) function of the vehicle. The light assembly further includes an inner lens having a first portion and a second portion. The first portion is formed from a homogenous mixture of polymethyl methacrylate (PMMA) and polyetheresteramide (PEEA). The first portion of the inner lens is operable to receive light from the first light source and reflect the light outward to provide the position light function. The second portion of the inner lens is formed from polymethyl methacrylate, and is operable to receive light from the second light source and direct the light outward to provide the DRL function.

A method of manufacturing an inner lens of a light assembly for a vehicle is also provided. The method includes molding a first portion from a homogenous mixture of polymethyl methacrylate and polyetheresteramide. A second portion is then molded onto the first portion. The second portion is molded from polymethyl methacrylate without any polyetheresteramide mixed therein. The polymethyl methacrylate with the polyetheresteramide in the first portion diffuses light from a first light source to provide a position light function for the vehicle. The polymethyl methacrylate without the polyetheresteramide in the second portion directs light outward to provide a Daytime Running Light (DRL) function for the vehicle.

Accordingly, the first portion of the inner lens reflects light to provide the position light function. The first portion of the inner lens appears completely transparent in the absence of light from the first light source. This allows a decorative trim piece to be clearly visible behind the inner lens, thereby providing a pleasing aesthetic appearance. When the first light source is engaged to provide light to the first portion of the inner lens, the polyetheresteramide diffuses the light from the first light source, and provides a fully and/or completely lit surface, which produces a glowing appearance without the noticeable presence of any light sources behind the inner lens. The first portion of the inner lens includes the polyetheresteramide mixed with the polymethyl methacrylate to provide the unique and desirable glowing appearance or fully lit surface because the required light output for the position light function is relatively low. The second portion of the inner lens, which is manufactured from only polymethyl methacrylate, and does not include any polyetheresteramide, is used to provide the light output required for the DRL function. The combination of the first portion of the inner lens with the polyetheresteramide mixed with the polymethyl methacrylate and the second portion of the inner lens manufactured from only polymethyl methacrylate without the polyetheresteramide allows for an aesthetically pleasing light assembly that produces a unique and desirable lighting effect for the position light function, while still providing the required light output for the DRL function.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Figure 1:
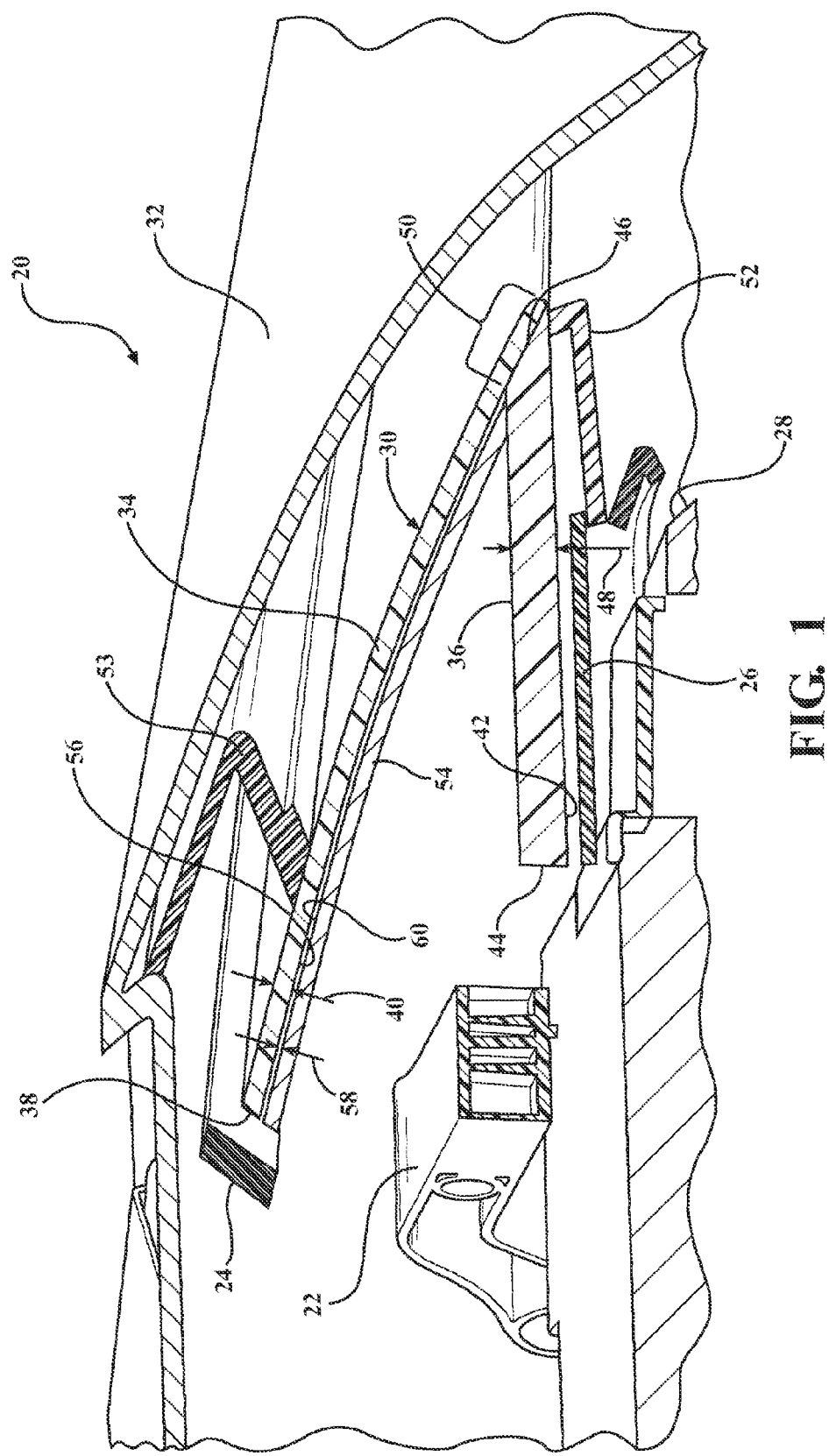
FIG. 1 is a schematic partially cross sectioned perspective view of a light assembly for a vehicle.
Figure 2:
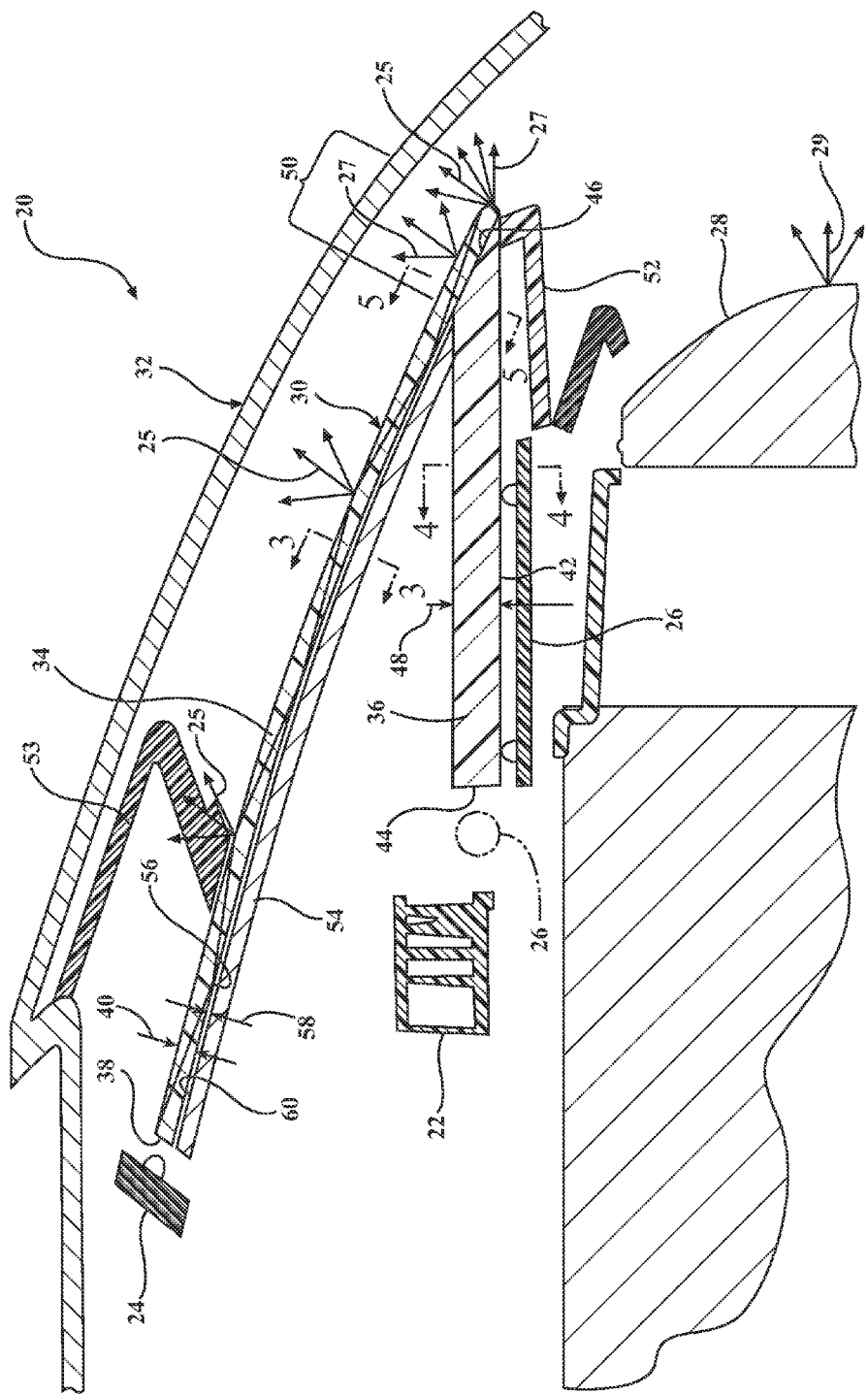
FIG. 2 is a schematic cross sectional view of the light assembly.

Referring to the Figures, wherein like numerals indicate like parts throughout the several views, a light assembly for a vehicle is generally shown at 20. Referring to FIGS. 1 and 2, the light assembly 20 is configured for a forward end of the vehicle, and may be shaped in any desirable fashion to present the desired aesthetics for the vehicle. The light assembly 20 is configured to provide a forward driving light function, a position light function, and a Daytime Running Light (DRL) function. The forward driving light function illuminates a roadway ahead of the vehicle to enable the driver to see the roadway in low light conditions. The forward driving function provides the high and/or low beam headlights for the vehicle. The position light function illuminates to make the vehicle visible to oncoming traffic during low light conditions or at night. The DRL function illuminates to make the vehicle visible to oncoming traffic during daylight. Because the DRL function must be visible during the day, the DRL function must provide a higher light output than the position light function, which must only be visible at night.

Referring to FIGS. 1 and 2, the light assembly 20 includes a housing 22. The housing 22 supports all of the different components of the light assembly 20, and is configured for attachment to the vehicle. Referring to FIG. 2, the light assembly 20 further includes a first light source 24, a second light source 26, and a third light source 28. The first light source 24 is operable to emit light for the position light function of the vehicle, which is generally indicated by light arrows 25. The first light source 24 may include one or more LEDs or a light pipe capable of providing the required illumination for the position light function. The second light source 26 is operable to emit light for the DRL function of the vehicle, generally indicated by light arrows 27. The second light source 26 may include one or more LEDs or a light pipe capable of providing the required illumination for the DRL function of the vehicle. The third light source 28 is operable to emit light for the forward driving light function of the vehicle, generally indicated by light arrows 29. The third light source 28 may include any light source capable of providing the required illumination for the forward driving function of the vehicle.

Referring to FIG. 2, the light assembly 20 includes an inner lens 30 and an outer lens 32. The outer lens 32 is manufactured from polycarbonate, and is disposed outward of the inner lens 30 and the third light source 28 to protect the inner lens 30 and the third light source 28 from applied forces, as well as to seal the forward end of the light assembly 20.

The inner lens 30 receives light from the first light source 24 and the second light source 26, and directs the light outward to provide the position light function and the DRL function of the vehicle. The inner lens 30 includes a first portion 34 and a second portion 36. The first portion 34 of the inner lens 30 is operable to receive light from the first light source 24 and reflect the light outward to provide the position light function. The second portion 36 of the inner lens 30 is operable to receive light from the second light source 26 and direct the light outward to provide the DRL function.

Referring to FIG. 2, the first portion 34 of the inner lens 30 includes a light receiving edge 38 disposed adjacent the first light source 24. Accordingly, the light from the first light source 24 (for the position light function) is introduced into the inner lens 30 along the light receiving edge 38 of the first portion 34 of the inner lens 30. As such, the first portion 34 of the inner lens 30 receives light from the first light source 24 through the light receiving edge 38.

Figure 3:
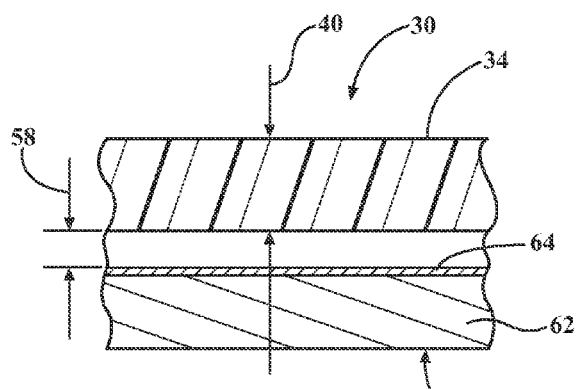
FIG. 3 is a cross sectional view of a first portion of an inner lens of the light assembly.

Preferably, as shown in FIGS. 2 and 3, the first portion 34 of the inner lens 30 includes a thickness 40 equal to or greater than 2.0 mm, and is manufactured and formed from a mixture of polymethyl methacrylate (PMMA) and polyetheresteramide (PEEA). The methyl methacrylate copolymer employed in the compositions of the present disclosure will contain a predominant amount, e.g., about 50 to about 90 parts by weight, preferably 50 to 80 parts by weight, of methyl methacrylate and a minor amount, e.g., about 10 to about 50 parts by weight, preferably 20 to 40 parts by weight, of one or more ethylenically unsaturated monomers such as styrene, acrylonitrile, methyl acrylate, ethyl acrylate and mixtures thereof. Preferably, the ethylenically unsaturated monomer comprises a mixture of styrene and acrylonitrile or styrene and ethyl acrylate wherein the styrene is present in the copolymer in an amount of about 10 to about 40, preferably 15 to 30, parts by weight and the acrylonitrile is present in the copolymer in an amount of about 5 to about 30, preferably 5 to 20, parts by weight, based on the weight of the copolymer or the ethyl acrylate is present in the copolymer in an amount of about 3 to about 10, preferably 5 to 10 parts by weight, based on the weight of the copolymer.

Preferably, the methyl methacrylate copolymer will have an average molecular weight of at least about 50,000, e.g., about 100,000 to about 300,000 and a glass transition temperature of at least about 50° C. Typically, the methyl methacrylate copolymer will have a refractive index of about 1.50 to about 1.53, preferably 1.51 to 1.52, (as measured in accordance with ASTM D-542).

The multipolymer compositions of the disclosure will also contain an effective amount of a polyetheresteramide to enhance the electrostatic charge dissipation of the copolymer. The polyetheresteramide should have a refractive index within about 0.005 units, preferably within 0.003 units, of the refractive index of the copolymer (as measured in accordance with ASTM D-542). Typically the polyetheresteramide will be present in the amount of about 1 to about 35, preferably 1.5 to 30, wt. %, based on the weight of the composition. The resultant composition when injection molded into a plaque having a thickness of 0.125 inch will be such that the plaque exhibits a haze of not greater than about 25%, preferably not greater than 15% (as measured in accordance with ASTM D-1003) and a light transmission of at least about 60%, preferably at least 80% (as measured in accordance with ASTM D-1003).

The polymethyl methacrylate with the polyetheresteramide may be the material Acrylite® LED from Evonik Corporation, which may be used to manufacture the first portion 34 of the inner lens 30. The first portion 34 of the inner lens 30 appears completely clear or transparent to the human eye when the first light source 24 is turned off and not illuminating the first portion 34 of the inner lens 30.

Referring to FIG. 2, light introduced into the first portion 34 of the inner lens 30 from the first light source 24 diffuses off of the polyetheresteramide dispersed throughout the first portion 34 of the inner lens 30, and is directed outward, away from the vehicle. Because the first light source 24 introduces light into the first portion 34 of the inner lens 30 along the light receiving edge 38, the first light source 24 may be positioned out of view or behind a bezel 53, so as to not be visible from outside the light assembly 20, through the outer lens 32 and the inner lens 30. Because the light from the first light source 24 bounces or reflects off the polyetheresteramide, the first portion 34 of the inner lens 30 provides a fully and/or completely lit signature/entity/function, which produces a homogenous, glowing appearance without the noticeable presence of any light sources behind the inner lens 30.

The second portion 36 of the inner lens 30 is formed from polymethyl methacrylate, without any polyetheresteramide, i.e., the second portion 36 is formed from only polymethyl methacrylate, and is characterized by the absence of polyetheresteramide.

Figure 4:
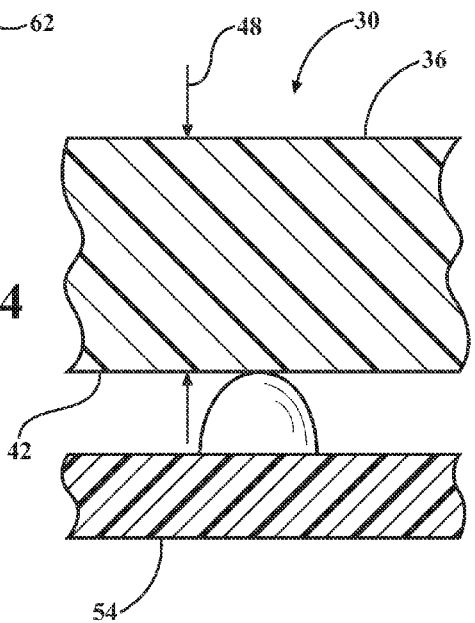
FIG. 4 is a cross sectional view of a second portion of the inner lens.

Referring to FIG. 2, the second light source 26 may be disposed adjacent either a light receiving surface 42 of the second portion 36, such as shown in FIG. 1, and also shown in FIG. 2 in solid lines, or adjacent a light receiving edge 44 of the second portion 36, such as shown in phantom in FIG. 2. The second portion 36 of the inner lens 30 includes a light emitting edge 46. The second portion 36 of the inner lens 30 directs light from the second light source 26 outward through the light emitting edge 46 of the second portion 36 through total internal reflection. Preferably, and as shown in FIGS. 2 and 4, the light emitting edge 46 of the second portion 36 defines a thickness. 48 equal to or greater than 2.0 mm. However, the thickness 48 of the second portion 36 of the inner lens 30 may vary from the exemplary embodiment noted above. If the light source is disposed adjacent the light receiving surface 42, then the second portion 36 of the inner lens 30 must be configured to reflect the light and direct the light outward through the light emitting edge 46 of the second portion 36. However, if the second light source 26 is disposed adjacent the light receiving edge 44 of the second portion 36, then the second portion 36 of the inner lens 30 does not need to re-direct or reflect the light, and merely directs the light through the second portion 36 to the light emitting edge 46 of the second portion 36 through total internal reflection.

Figure 5:
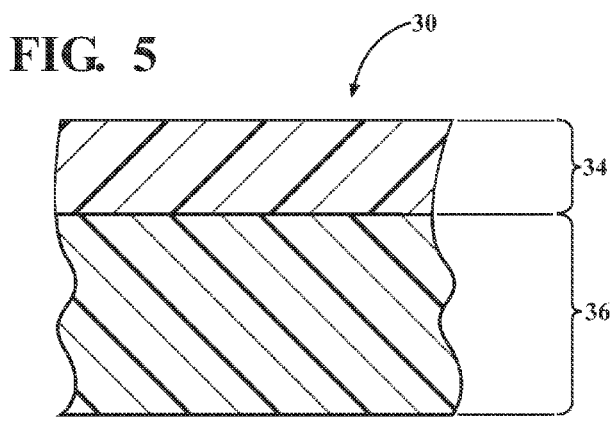
FIG. 5 is a cross sectional view of the inner lens showing the confluence of the first portion and the second portion.

Referring to FIGS. 2 and 5, the light emitting edge 46 is covered by the first portion 34 of the inner lens 30, such that the light emitted outward from the light emitting edge 46 of the second portion 36 passes through the thickness 40 of the first portion 34 along a segment 50 of the first portion 34 of the inner lens 30. Accordingly, because the light exiting the light emitting edge 46 of the second portion 36 must pass through the first portion 34, the light from the second portion 36 is reflected or diffused by the polyetheresteramide mixed into the polymethyl methacrylate of the segment 50 of the first portion 34 of the inner lens 30. However, because the light from the second portion 36 of the inner lens 30 exits through the relatively small or narrow thickness of the light emitting edge 46 with a relatively high intensity, the light from the second portion 36 only has to pass through the small segment 50 of the first portion 34 of the inner lens 30, and the intensity of the light from the second portion 36 of the inner lens 30 is sufficiently maintained to provide the DRL function of the vehicle, while providing the same aesthetically pleasing appearance as the position light function. It should be appreciated that the position light function and the DRL function may be operated simultaneously so that the first portion 34 of the inner lens 30 is completely lit when the DRL function is engaged, while still providing the required light output for the DRL function.

As best shown in FIG. 2, the light assembly 20 may further include a bezel 52 to trim out the second portion 36 of the inner lens 30, so that the second portion 36 of the inner lens 30 and the second light source 26 are not visible from the outside of the light assembly 20.

As noted above, when the first light source 24 is not lit, the first portion 34 of the inner lens 30 is completely clear and/or transparent to the human eye. This allows for a trim panel 54 to be disposed adjacent to an inner surface 56 of the first portion 34 of the inner lens 30. Referring to FIGS. 2 and 3, the trim panel 54 is positioned relative to the first portion 34 of the inner lens 30 to define a gap 58 between an outer surface 60 of the trim panel 54 and the inner surface 56 of the first portion 34. Preferably, the gap 58 is equal to or greater than 1.0 mm. However, the gap 58 may vary from the exemplary embodiment described herein. The trim panel 54 may be manufactured from a substrate 62 covered by a film layer 64. Accordingly, the substrate 62 supports the film layer 64. The substrate 62 is preferably manufactured from polymethyl methacrylate. The film layer 64 is preferably manufactured from Polyvinylidene Fluoride (PVDF). The film layer 64 may be designed to provide any desirable aesthetic appearance to the light assembly 20 that will be visible when the first light source 24 is turned off. For example, the trim panel 54, and more specifically the film layer 64, may include a chrome or some other colored appearance, and may also include a design or emblem fashioned therein. The emblem may be raised or recessed into an outer surface of the trim panel 54. For example, the design may include an emblem, badge, or some other insignia presented on the outer surface 60 of the trim panel 54.

Preferably, the inner lens 30 is manufactured from a two shot molding process, such that the first portion 34 and the second portion 36 of the inner lens 30 are integrally connected together, without any visible seams. The inner lens 30 may be manufactured with the two shot molding process because the inner lens 30 and the outer lens 32 are formed from different materials. As noted above, the first portion 34 is manufactured from polymethyl methacrylate with the polyetheresteramide, whereas the second portion 36 is manufactured from only polymethyl methacrylate, without the polyetheresteramide. The two shot molding process includes molding the first portion 34 from the mixture of polymethyl methacrylate and polyetheresteramide in a mold. When the first portion 34 is cooled and solidified, the mold is adjusted and the second portion 36 of the inner lens 30 is molded onto the first portion 34. As noted above, the second portion 36 is molded from polymethyl methacrylate without any polyetheresteramide.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A light assembly for a vehicle, the light assembly comprising:
    a first light source operable to emit light for a position light function of the vehicle;
    a second light source operable to emit light for a Daytime Running Light (DRL) function of the vehicle; and
    an inner lens including:
        a first portion formed from a mixture of polymethyl methacrylate and polyetheresteramide, wherein the first portion of the inner lens is operable to receive light from the first light source and reflect the light outward to provide the position light function; and
        a second portion formed from polymethyl methacrylate, and operable to receive light from the second light source and direct the light outward to provide the DRL function.

2. The light assembly set forth in claim 1 wherein the second portion of the inner lens is characterized by the absence of polyetheresteramide.

3. The light assembly set forth in claim 1 wherein the first portion of the inner lens includes a light receiving edge disposed adjacent the first light source, wherein the first portion of the inner lens receives light from the first light source through the light receiving edge.

4. The light assembly set forth in claim 1 wherein the mixture of polymethyl methacrylate and polyetheresteramide includes between 50 to 90 parts by weight of polymethyl methacrylate, and between 20 to 40 parts by weight of at least one ethylenically unsaturated monomer.

5. The light assembly set forth in claim 4 wherein the mixture of polymethyl methacrylate and polyetheresteramide includes between 1 to 35 wt. %, based on the weight of the mixture.

6. The light assembly set forth in claim 1 wherein the second portion of the inner lens includes a light emitting edge, and wherein the second portion directs light from the second light source outward through the light emitting edge.

7. The light assembly set forth in claim 6 wherein the light emitting edge is covered by the first portion of the inner lens, such that the light emitted outward from the second portion passes through the first portion of the inner lens.

8. The light assembly set forth in claim 1 further comprising a trim panel disposed adjacent to an inner surface of the first portion of the inner lens.

9. The light assembly set forth in claim 8 wherein the trim panel includes a substrate supporting a film layer, wherein the substrate is polymethyl methacrylate, and the film layer is polyvinylidene fluoride.

10. The light assembly set forth in claim 9 wherein the film layer includes an emblem embossed therein.

11. The light assembly set forth in claim 8 wherein the trim panel is positioned relative to the first portion of the inner lens to define a gap between an outer surface of the trim panel and the inner surface of the first portion.

12. The light assembly set forth in claim 10 wherein the gap is equal or greater than 1.0 mm.

13. The light assembly set forth in claim 1 further comprising an outer lens manufactured from polycarbonate, and disposed outward of the inner lens.

14. The light assembly set forth in claim 1 wherein the second light source is disposed adjacent either a light receiving edge of the second portion, or a light receiving surface of the second portion.

15. A light assembly for a vehicle, the light assembly comprising:
  a first light source operable to emit light for a position light function of the vehicle;
  a second light source operable to emit light for a Daytime Running Light (DRL) function of the vehicle;
  a third light source operable to emit light for a forward driving light function of the vehicle;
  an inner lens; and
  an outer lens manufactured from polycarbonate, and disposed outward of the inner lens to protect the third light source and the inner lens;
  wherein the inner lens includes:
    a first portion formed from a homogenous mixture of polymethyl methacrylate and polyetheresteramide, wherein the first portion of the inner lens is operable to receive light from the first light source and reflect the light outward to provide the position light function; and
    a second portion formed from polymethyl methacrylate without any polyetheresteramide, wherein the second portion of the inner lens is operable to receive light from the second light source and direct the light outward through a light emitting edge of the second portion to provide the DRL function;
    wherein the light emitting edge of the second portion is covered by the first portion of the inner lens, such that the light emitted outward through the light emitting edge of the second portion passes through a cross sectional thickness of the first portion of the inner lens.

16. The light assembly set forth in claim 15 wherein the first portion of the inner lens includes a light receiving edge disposed adjacent the first light source, and wherein the first portion of the inner lens receives light from the first light source through the light receiving edge.

17. The light assembly set forth in claim 15 further comprising a trim panel disposed adjacent to an inner surface of the first portion of the inner lens.

18. The light assembly set forth in claim 17 wherein the trim panel is positioned relative to the first portion of the inner lens to define a gap between an outer surface of the trim panel and the inner surface of the first portion.

19. The light assembly set forth in claim 17 wherein the trim panel includes a substrate supporting a film layer, wherein the substrate is polymethyl methacrylate, and the film layer is polyvinylidene fluoride.

20. A method of manufacturing an inner lens of a light assembly for a vehicle, the method comprising:
  molding a first portion from a mixture of polymethyl methacrylate and polyetheresteramide; and
  molding a second portion onto the first portion, wherein the second portion is molded from polymethyl methacrylate without any polyetheresteramide;
  wherein the polymethyl methacrylate with the polyetheresteramide in the first portion diffuses light from a first light source to provide a position light function for the vehicle, and wherein the PMMA without the polyetheresteramide in the second portion directs light outward to provide a Daytime Running Light (DRL) function for the vehicle.

* * * * *